United States Patent
Leigh

(10) Patent No.: US 7,328,121 B1
(45) Date of Patent: Feb. 5, 2008

(54) VIBRATION DATA COLLECTION METHOD AND APPARATUS

(75) Inventor: Nigel Leigh, Christchurch (NZ)

(73) Assignee: Commtest Instruments Ltd. (NZ)

( * ) Notice: Subject to any disclaimer, the term of this patent is extended or adjusted under 35 U.S.C. 154(b) by 0 days.

(21) Appl. No.: 11/584,462

(22) Filed: Oct. 20, 2006

(51) Int. Cl.
*G01P 15/00* (2006.01)
*G06F 15/00* (2006.01)

(52) U.S. Cl. .................................. 702/141
(58) Field of Classification Search ............ 702/141
See application file for complete search history.

(56) References Cited

U.S. PATENT DOCUMENTS

| | | | | |
|---|---|---|---|---|
| 4,547,771 | A * | 10/1985 | Rockwood et al. | 340/686.1 |
| 5,123,331 | A * | 6/1992 | Hirai | 91/363 A |
| 5,407,265 | A * | 4/1995 | Hamidieh et al. | 340/680 |
| 6,321,602 | B1 * | 11/2001 | Ben-Romdhane | 73/660 |
| 6,799,139 | B2 * | 9/2004 | Slates | 702/142 |
| 6,868,348 | B1 * | 3/2005 | Stoutenburg et al. | 702/56 |

OTHER PUBLICATIONS

Shinoda et al., "Real-time computation of distance and displacement by software instruments using optical frequency modulation", Aug. 2002, IEEE, pp. 82-83 vol. 1.*

* cited by examiner

*Primary Examiner*—Michael P. Nghiem
*Assistant Examiner*—Cindy D. Khuu
(74) *Attorney, Agent, or Firm*—Pitts & Brittian, PC

(57) ABSTRACT

The present invention relates to a vibration data collection method and apparatus. The invention includes processes of receiving electrical vibration signals from at least one vibration sensor, digitizing the electrical vibration signals to obtain digitized vibration signals, calculating the average of the digitized vibration signals over a predetermined period, and storing the average in a storage device. The processes above are repeated to provide a history of averages. When vibration data recording is requested, the invention proceeds to check the history of averages to determine if the averages within a time period are substantially equal to one another within a tolerance. If the averages are within the tolerance, the digitized vibration signals are recorded.

23 Claims, 2 Drawing Sheets

VIBRATION DATA COLLECTION METHOD AND APPARATUS

FIELD OF THE INVENTION

The present invention relates to a vibration data collection method and apparatus. In particular, but not exclusively, the present invention relates to a vibration data collection method and apparatus that automatically and optimally determine the time required to wait for sensors and electronics to settle before a reading is made.

BACKGROUND TO THE INVENTION

Prior to making a reading or recording, a vibration measuring instrument must ideally wait for its one or more sensors and electronics to 'settle'. This is required to ensure that any reading made is accurate and is not substantially affected by transient responses of the sensors and electronics. For instance, when a sensor is powered up, its internal pre-amplifier requires time to stabilise. Also, where integrators are used to convert acceleration vibration data into velocity vibration data, or to convert velocity vibration data into displacement vibration data, the integrators require some time to establish a mean level of their input signal to avoid excessive drift in their output.

There may also be conditions resulting from an operator's interaction with the instrument that require a settling time before vibration data is collected. For instance, an operator may have changed the selection of analogue signal conditioning prior to analogue-to-digital conversion, such as changing AC-coupling to DC-coupling. Alternatively or additionally, the conversion sampling rate may have been changed. Even though the sampling rates are typically accurately calibrated, the integration process commonly carried out in vibration instruments provides significant amplification to any slight step change in output level. Further, the instrument's sensors may have been moved recently, which can have a dramatic effect on the integration process.

The amount of time required for settling depends on many factors, including the time the sensors themselves require to power up and stabilise, the number of integration processes required (e.g. two, when a displacement reading is required from an accelerometer), the duration of the recording, which is governed by the maximum frequency of interest or $F_{max}$, the number of spectral lines and the number of averages, and the minimum frequency of interest or $F_{min}$.

Traditionally, to determine the settling time, a table of settling times would be created based on several of the parameters noted above. When a recording was desired, the appropriate amount of settling time was calculated from the table. This process is labour-intensive and time-consuming. Further, to ensure that sufficient settling time was allowed for in all situations, the values in the table were designed to be reasonably conservative. This meant that, in some situations, longer than necessary times were allowed for settling.

It is an object of the present invention to either provide a method and apparatus that reduce the time it takes to collect vibration data by automatically determining the required settling time, or at least provide the public with a useful choice.

SUMMARY OF THE INVENTION

In one aspect, the present invention relates to a vibration data collection method comprising the steps of: receiving electrical vibration signals from at least one vibration sensor; digitising the electrical vibration signals to obtain digitised vibration signals; calculating the average of the digitised vibration signals over a predetermined period; storing the average in a storage device; wherein when data recording is not requested: repeating the above steps of receiving, calculating and storing so as to provide a history of averages, and wherein when data recording is requested: checking the history of averages to determine if the averages within a time period are substantially equal to one another within a first tolerance; and recording the digitised vibration signals if the averages within the time period are substantially equal to one another within the first tolerance.

Preferably, the at least one vibration sensor is an accelerometer, the digitised vibration signals are digitised acceleration signals, and the history of averages is a history of acceleration averages.

Preferably, the method further comprises the steps of: integrating the digitised acceleration signals to obtain digitised velocity signals; calculating the average of the digitised velocity signals over a predetermined period; storing the average of the digitised velocity signals as a velocity average in a storage device; wherein when data recording is not requested: repeating the above steps of integrating, calculating and storing so as to provide a history of velocity averages, and wherein when data recording is requested: checking the history of velocity averages to determine if the velocity averages within a time period are substantially equal to one another within a second tolerance; and recording the digitised velocity signals if the velocity averages within the time period are substantially equal to one another within the second tolerance.

Preferably, the method further comprises the steps of: integrating the digitised velocity signals to obtain digitised displacement signals; calculating the average of the digitised displacement signals over a predetermined period; storing the average of the digitised displacement signals as a displacement average in a storage device; wherein when data recording is not requested: repeating the above steps of integrating, calculating and storing so as to provide a history of displacement averages, and wherein when data recording is requested: checking the history of displacement averages to determine if the displacement averages within a time period are substantially equal to one another within a third tolerance; and recording the digitised displacement signals if the displacement averages within the time period are substantially equal to one another within the third tolerance.

Preferably, when recording is requested, the method further comprises the step of recording the signals whose history of averages is the first to have values that substantially equal to one another within a tolerance.

Preferably, the method further comprises the step of recording the signals whose history of averages is next to have values that substantially equal to one another within a tolerance.

Preferably, the method further comprises the step of recording the digitised velocity signals only once the history of acceleration averages and the history of velocity averages each have values within a time period that are substantially equal to one another within their respective tolerance.

Preferably, the method further comprises the step of recording the digitised displacement signals only once the history of acceleration averages, the history of velocity averages, and the history of displacement averages each have values within a time period that are substantially equal to one another within their respective tolerance.

Preferably, at least three averages are stored in each of the history of acceleration averages, the history of the velocity averages, and the history of the displacement averages.

Preferably, the method further comprises the step of recording the signals if a predetermined time-out period has elapsed, even if the averages within the time period are not substantially equal to one another within its tolerance. In the preferred form, a different predetermined time-out period is provided for recording each of the digitised acceleration signals, digitised velocity signals and digitised displacement signals.

In another aspect, the present invention relates to a vibration data collection apparatus comprising: at least one input to receive electrical vibration signals from one or more vibration sensors; an analogue-to-digital converter to convert the electrical vibration signals into digital vibration signals; a first averager in communication with the analogue-to-digital converter to the determine an average of the digitised vibration signals over a predetermined period; a storage device in communication with the first averager to store the average determined; and a processor adapted to: when data recording is not requested: store the average determined by the first averager in the storage device so as to provide a history of averages, and when data recording is requested: check the history of averages to determine if the averages within a time period are substantially equal to one another within a first tolerance; and record the digitised vibration signals if the averages within the time period are substantially equal to one another within the first tolerance.

Preferably the vibration sensor is an accelerometer, the digitised vibration signals are acceleration vibration signals and the history of averages is a history of acceleration averages.

Preferably, the apparatus further comprises: a first integrator to convert the acceleration vibration signals into velocity vibration signals; and a second averager in communication with the first integrator to determine an average of the velocity vibration signals over a predetermined period; wherein the processor is further adapted to: when velocity data recording is not requested: store the average determined by the second averager in the storage device so as to provide a history of velocity averages, and when velocity data recording is requested: check the history of velocity averages to determine if the velocity averages within a time period are substantially equal to one another within a second tolerance; and record the velocity vibration signals if the velocity averages within the time period are substantially equal to one another within the second tolerance.

Preferably, the apparatus further comprises: a second integrator to convert the velocity vibration signals into displacement vibration signals; and a third averager in communication with the second integrator to determine an average of the displacement vibration signals over a predetermined period; wherein the processor is further adapted to: when displacement data recording is not requested: store the average determined by the third averager in the storage device so as to provide a history of displacement averages, and when displacement data recording is requested: check the history of displacement averages to determine if the displacement averages within a time period are substantially equal to one another within a third tolerance; and record the displacement vibration signals if the displacement averages within the time period are substantially equal to one another within the third tolerance.

Preferably, the first, second and third averagers are exponential averagers. Preferably, the storage device comprises a buffer with a minimum length of three.

Preferably, the processor is adapted to record the signal whose history is first to have values that substantially equal one another within its tolerance. The processor is preferably further adapted to record the signal whose history is next to have values that substantially equal one another within its tolerance.

Preferably, the processor is adapted to record the velocity vibration signals only once the history of acceleration averages and the history of velocity averages each have values that substantially equal one another within their respective tolerances.

Preferably, the processor is further adapted to record the displacement vibration signals only once the history of acceleration averages, the history of velocity averages and the history of displacement averages each have values that substantially equal one another within their respective tolerances.

Preferably, the processor is further adapted to record the vibration signals if a predetermined time-out period has elapsed, even if the history of averages do not have values within a time period that are substantially equal to one another within its tolerance. In the preferred form, a different predetermined time-out period is provided for the recording of each of the acceleration vibration signals, velocity vibration signals and displacement vibration signals.

The term 'comprising' as used in this specification and claims means 'consisting at least in part of', that is to say when interpreting statements in this specification and claims which include that term, the features, prefaced by that term in each statement, all need to be present but other features can also be present. Related terms such as 'comprise' and 'comprised' are to be interpreted in similar manner.

The term 'data' as used in this specification and claims relate to vibration data and is used interchangeably with the concept of digitised signals. Specifically, 'vibration data' is interchangeable with 'digitised vibration signals', 'acceleration data' is interchangeable with 'digitised acceleration signals', 'velocity data' is interchangeable with 'digitised velocity signals', and 'displacement data' is interchangeable with 'digitised displacement signals'

The present invention may also be said broadly to consist in the parts, elements and features referred to in this specification, individually or collectively, and any combinations of any two or more said parts, elements or features. Where specific integers are mentioned herein which have known equivalents in the art to which this invention relates, such known equivalents are deemed to be incorporated herein as if individually set forth.

BRIEF DESCRIPTION OF THE FIGURES

Preferred forms of the method and apparatus of the present invention will now be described with reference to the accompanying drawings.

DETAILED DESCRIPTION OF THE PREFERRED FORMS

The Preferred Form Method

Figure 1A:
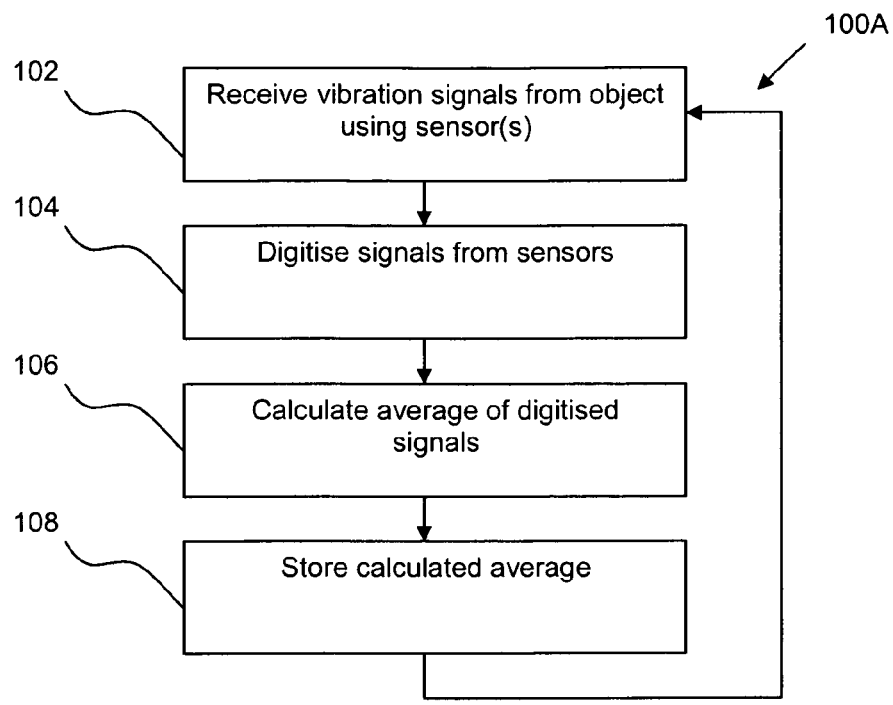
FIGS. 1A and 1B show flowcharts of the preferred form method of the present invention.
Figure 1B:
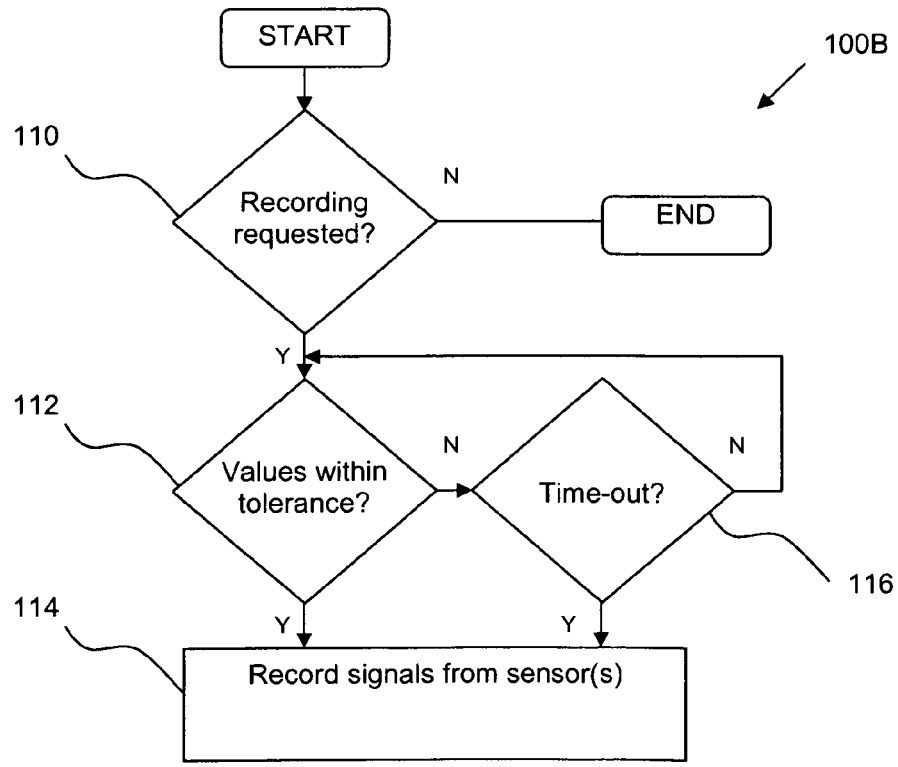

Referring to FIGS. 1A and 1B, the preferred form method is shown in the form of flowcharts 100A and 100B. The first flowchart 100A represents a background processing aspect of the method, which continually stores average values. The second flowchart 100B represents processing that is carried out to determine if vibration data recording should be carried out.

In the first flowchart 100A, the method begins in step 102, where the vibrations of an object, such as machinery, is received in the form of electrical signals directly or indirectly from one or more vibration sensors. As will be known in the art, the vibration sensors convert mechanical vibrations into electrical signals representing the vibrations.

In step 104, the electrical signals, which are received in analogue form, are digitised using an analogue-to-digital converter (ADC). As a result of this step, digitised signals representing the analogue electrical signals are produced.

The digitised signals are then used in step 106 to calculate the average of the digitised signals. As used in this specification, the average of a signal denotes the average magnitude of the signal. Specifically, the average is determined by measuring the magnitude of the digitised signal over a predetermined period, and calculating the average of the magnitude over the predetermined period. In the preferred form, the average is calculated using one or more exponential averagers. The calculated average is stored in a storage device, such as a buffer, in step 108. In the preferred form, an average value is calculated and stored every 0.25 s. Persons skilled in the art will appreciate that the frequency at which the average value is calculated and stored can vary depending on the particular measurement being made or the particular level of accuracy desired.

As long as recording is not requested, the method proceeds to repeat step 102 through to step 108, that is from receiving the electrical vibration signals to storing the average of the signals in the storage device. In this way, the storage device stores a history of averages. For instance, if a circular buffer with a length of 10 is used, the history of averages will store the last ten average values calculated. The number of averages to be stored, and thus the required buffer length, depends on the required duration of the recording. If the recording requested is short, which is usually the case when investigating high frequency vibration signals (that is, $F_{max}$ has a high value), the history may be kept short. It is, however, preferable for the buffer to store average values over a time period comparable to an upper limit of recording durations.

When recording is requested, as determined in step 110 of the second flowchart 100B, the method proceeds to step 112 to check the history of averages to determine if the average values within a time period are substantially equal to one another within a tolerance. The time period may be specified and need not be equivalent to the length of the buffer. For example, where a 10-length buffer is used with averages being calculated and stored every 0.25 s, the buffer length in terms of time is 2.5 seconds. If a high frequency, and thus short, recording is being made, only the last 0.5 seconds may be of interest, for example. As such, the method only needs to check the latest two average values, rather than all ten average values stored in the buffer. It is, however, preferable for the buffer to have at least a length of three. It is also preferable to always store average values to the full length of the buffer. This ensures that, when a longer recording is requested (such as when the value of $F_{max}$ is lowered), the buffer will have a sufficient number of averages to accurately determine a settling time for that recording.

It should be noted that, regardless of whether recording is requested, the background processing of the first flowchart 100A is continually carried out. This ensures that the history of averages is continually updated during recording so as to provide an up-to-date history of averages.

Persons skilled in the art will appreciate that, when the present invention refers to average values that substantially equal one another within a tolerance, the tolerance will depend on the factors relating to the recording being made. As will be later explained, the recording may be of acceleration signals, velocity signals or displacement signals. Each of these signals are preferably associated with a different tolerance (i.e. a first tolerance for acceleration signals, a second tolerance for velocity signals, and a third tolerance for displacement signals). The tolerance may also be dependent on the interest of an operator in certain types of vibration signals, such as low frequency vibration signals. For example, an operator may specify the minimum frequency of interest, or $F_{min}$, at 0 Hz, which indicates an interest in all low frequency signals.

If, from step 112, the average values over a time period have been found to be substantially equal to one another within the tolerance, the method concludes that the sensors and electronics have settled and thus proceeds to step 114 to record the digitised vibration signals. Following completion of the recording, the method preferably reverts back to the start in step 102. This ensures the history of averages is continuously updated and accurately reflects the stability of the sensors and electronics when recording is next requested.

It is preferable that a time-out period be specified to allow recording to take place even if the average values do not substantially equal one another within a tolerance. This is because the vibrations being measured may include low frequency vibrations that give the appearance of unsettled sensors. If there is no time-out in such a circumstance, the method will continuously perceive the low frequency vibrations as an indication of unsettled sensors, and not make any recording even though the sensors have actually settled. Where a time-out is provided, following a determination that the average values are unsatisfactory in step 112, the method proceeds to determine if the time-out period has elapsed in step 116. If the time-out period has elapsed, the method forces a recording in step 114. If the time-out period has not elapsed, the method loops back to step 112 to determine if the average values are satisfactory. In this way, the method of the second flowchart 100B continues checking the averages until the averages have satisfactory values, or until the time-out period elapses. As before, the method of the first flowchart 100A continues running in the background.

As noted earlier, in step 102, the vibrations of an object are received in the form of electrical signals from one or more sensors. In the preferred form, the one or more sensors are accelerometers. The electrical signals generated by the sensors in this form are thus acceleration signals. If the method of FIG. 1 is carried out on these signals, the history of averages will reflect only acceleration averages, and the recording step will only record acceleration signals. It is, however, preferable to also process and record data relating to velocity signals and displacement signals, as noted in the present inventor's published U.S. Patent Application 2006/0150738. To do this, the acceleration signals, once digitised in step 104, are integrated to obtain velocity signals. The velocity signals are then integrated to obtain displacement signals. For each of the velocity signals and the displacement signals, the process from steps 106 through to 114/116 is carried out. This then yields a separate history of velocity averages and a separate history of displacement averages, which are used to determine when the velocity signals and displacement signals are sufficiently settled and can be recorded.

The Preferred Form Apparatus

Figure 2:
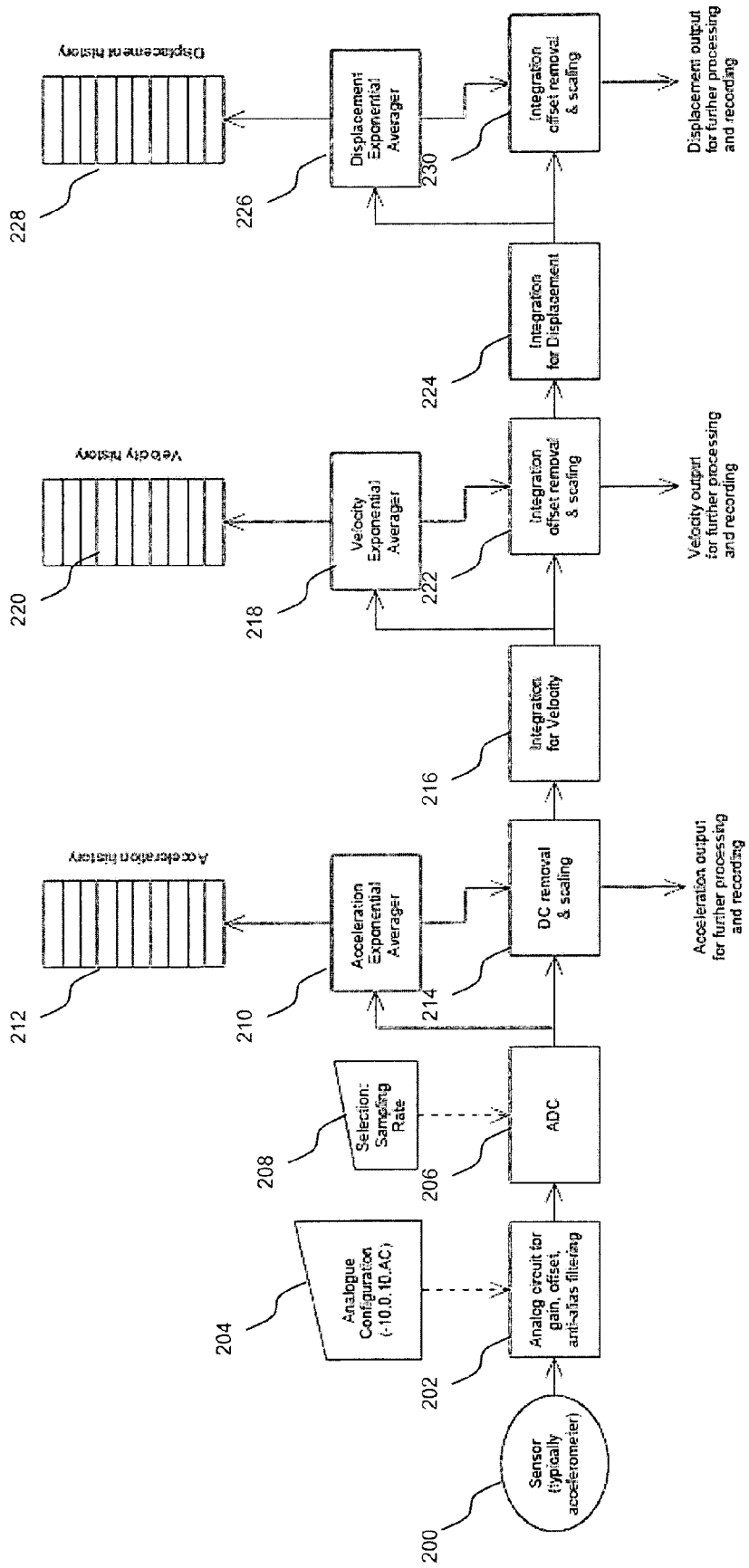
FIG. 2 shows a block schematic of the preferred form apparatus of the present invention.

The preferred form apparatus is shown in schematic form in FIG. 2. The apparatus may be formed as a portable device for data collection and optionally processing. Alternatively, the apparatus may be a remote or online system that is able to remotely receive signals from sensors. Although separate blocks are shown for separate components in the figure, skilled persons will readily appreciate that some blocks may be combined together in a single device or component. Furthermore, some of the blocks may be implemented via algorithm programmed into or accessible by a processor.

As illustrated in the figure, the preferred form apparatus includes one or more sensors 200. The one or more sensors 200 are, in the preferred form, accelerometers. It is not essentially, however, to provide the apparatus of the invention with accelerometers. For example, the apparatus may selectively receive, via an input, vibration signals from detachable or remote sensors. Further, the apparatus may retrieve previously-stored electrical signals from a database. All that is required is for the apparatus to receive electrical signals that are directly or indirectly received from one or more vibration sensors.

In the preferred form, the electrical vibration signals, which are received as analogue acceleration signals from the accelerometers, undergo conditioning in an analogue circuit 202. The circuit 202 is designed to adjust the gain and offset of the acceleration signals. Anti-aliasing filtering, as known in the art, may also be carried out at this stage. Controlling parameters for the analogue circuit are obtained via an analogue configuration input 204.

The analogue acceleration signals are then digitised using an analogue-to-digital converter (ADC) 206 to produce digitised acceleration signals. In the preferred form, the ADC 206 has an adjustable sampling rate, which is dependent on a sampling rate input 208. The processing benefits of having an adjustable sampling rate is described in the present inventor's published U.S. Patent Application 2006/0150738.

As shown, the ADC 206 is in communication with a first averager 210, which is preferably an exponential averager that generates a highly-filtered average of the signals it receives. In use, the first averager 210 receives digitised acceleration signals from the output of the ADC 206 to calculate an average acceleration value based on the digitised acceleration signals received over a time period. The average acceleration value calculated is then stored in a storage device 212, which is a buffer having a length of 10 in the preferred form. Skilled persons will appreciate that any other buffer or forms of storage device may be used instead of the buffer illustrated.

The apparatus as shown in FIG. 2 also includes optional direct current (DC) removal and scaling, indicated with the label 214, for the digitised acceleration signals. This optional step is preferably carried out where the digitised acceleration signals are required for further processing, such as for the processing described in the present inventor's U.S. published application noted earlier.

Following the optional DC removal and scaling, the digitised acceleration signals are sent to a first integrator 216. As will be known by skilled persons, integrating acceleration vibration signals yield velocity vibration signals. Once the velocity vibration signals are outputted from the first integrator, the signals preferably undergo the same averaging process carried out for the acceleration signals. As shown in the figure, this is done by coupling a second averager 218 to the first integrator 216. A buffer 220 is then coupled to the second averager 218 to receive and store average velocity values calculated by the second averager 218.

Analogous to the optional DC offset and scaling noted earlier, the velocity vibration signals outputted from the first integrator 216 may optionally undergo integration offset removal and scaling, indicated as 222 in the figure. The velocity vibration signals are then sent to a second integrator 224 to be integrated and converted into displacement vibration signals. Similar to the process noted above for the velocity vibration signals, the displacement vibration signals are averaged using a third averager 226, which is in communication with a buffer 228 to store average displacement values calculated by the third averager 226. Also, if the displacement vibration signals are optionally required for further processing, the signals are processed at 230 to remove any integration offset and to suitably scale the signals.

In use, a processor in the preferred form apparatus of the invention keeps the sensors powered between actual readings or recordings. In this way, the buffers for each of the acceleration, velocity and displacement signals will have a history of average values that reflect current settling conditions. The two integrators 216 and 224, and the three averagers 210, 218 and 226 are also powered and continue to supply the buffers with current average values. Preferably, the processor is provided with data relating to settling times recommended by the manufacturer of the vibration sensors (typically 3 s). Where such information is provided, the processor may be adapted to force settling to continue for at least half the recommended time, even if the history of average values provide an earlier indication of settling.

When vibration data recording is requested, the processor checks the relevant history to determine if the stored average values within a time period are substantially equal to one another within a tolerance. That is, if acceleration data recording is requested, the processor checks the history of acceleration averages to determine if the stored acceleration averages within a time period are substantially equal to one another within a tolerance. If so, the processor initiates the recording. If not, the processor waits until such time as the averages are acceptable or a time-out period elapses before initiating the recording. In the preferred form, the time-out values are set differently, or are staggered, for recording each of the acceleration signals, velocity signals and displacement signals.

In addition to checking the relevant history when recording is requested, the processor is adapted to continue supplying the buffers with current average values. In essence, the process of supplying the buffers with current average values is a background task that is carried out regardless of whether a recording is taking place at the time. This ensures that the buffers always reflect the current settling conditions.

Given the above, it is clear that the preferred form of the present invention automatically and dynamically takes into account the settling time required before recording vibration data. In other words, the present invention allows for a recording to begin as soon as a signal is sufficiently stable (or if a time-out elapses) for that particular recording. These advantages optimise the process of vibration data collection.

The arrangement of the present invention allows further optimisation of vibration data collection. In particular, the method and apparatus of the system allow the ordering of the set of recordings at each measurement location so that the types of recording (acceleration, velocity, displacement) that need the least settling time are taken first. This enables their recording time to constitute part of the settling time for other recordings. So, if the spread of average values in the history of velocity averages is above its predefined tolerance, and the spread of average values in the history of acceleration averages is within its predefined tolerance, the present invention can, if requested, begin recording acceleration vibration data while it waits for the velocity vibration signals to settle. As such, in response to a request to record data, the vibration signal whose history is first to have values that substantially equal one another within its tolerance can be recorded first, and vibration signals whose history is next to have values that substantially equal one another within its tolerance can be recorded next, and so on.

Preferably, the recordings are designed to be cascaded such that a velocity recording cannot be made before both acceleration averages and velocity averages fall within their respective tolerance. Similarly, a displacement recording cannot be made before the acceleration averages, velocity averages and displacement averages fall within their respective tolerance.

The foregoing describes the invention including preferred forms thereof. Alterations and modifications as will be obvious to those skilled in the art are intended to be incorporated within the scope hereof, as defined by the accompanying claims.

The invention claimed is:

1. A vibration data collection method comprising the steps of:
    receiving electrical vibration signals from at least one vibration sensor;
    digitising the electrical vibration signals to obtain digitised vibration signals;
    calculating the average of the digitised vibration signals over a predetermined period;
    storing the average in a storage device;
    wherein when data recording is not requested:
        repeating the above steps of receiving, calculating and storing so as to provide a history of averages, and
    wherein when data recording is requested:
        checking the history of averages to determine if the averages within a time period are substantially equal to one another within a first tolerance; and
        recording the digitised vibration signals if the averages within the time period are substantially equal to one another within the first tolerance.

2. The method of claim 1 wherein the at least one vibration sensor is an accelerometer, the digitised vibration signals are digitised acceleration signals, and the history of averages is a history of acceleration averages.

3. The method of claim 2 further comprising the steps of:
    integrating the digitised acceleration signals to obtain digitised velocity signals;
    calculating the average of the digitised velocity signals over a predetermined period;
    storing the average of the digitised velocity signals as a velocity average in a storage device;
    wherein when data recording is not requested:
        repeating the above steps of integrating, calculating and storing so as to provide a history of velocity averages, and
    wherein when data recording is requested:
        checking the history of velocity averages to determine if the velocity averages within a time period are substantially equal to one another within a second tolerance; and
        recording the digitised velocity signals if the velocity averages within the time period are substantially equal to one another within the second tolerance.

4. The method of claim 3 further comprising the steps of:
    integrating the digitised velocity signals to obtain digitised displacement signals;
    calculating the average of the digitised displacement signals over a predetermined period;
    storing the average of the digitised displacement signals as a displacement average in a storage device;
    wherein when data recording is not requested:
        repeating the above steps of integrating, calculating and storing so as to provide a history of displacement averages, and
    wherein when data recording is requested:
        checking the history of displacement averages to determine if the displacement averages within a time period are substantially equal to one another within a third tolerance; and
        recording the digitised displacement signals if the displacement averages within the time period are substantially equal to one another within the third tolerance.

5. The method of claim 4 wherein, when recording is requested, the method further comprises the step of recording the signals whose history of averages is the first to have values that substantially equal to one another within a tolerance.

6. The method of claim 5 further comprising the step of recording the signals whose history of averages is next to have values that substantially equal to one another within a tolerance.

7. The method of claim 3 further comprising the step of recording the digitised velocity signals only once the history of acceleration averages and the history of velocity averages each have values within a time period that are substantially equal to one another within their respective tolerance.

8. The method of claim 4 further comprising the step of recording the digitised displacement signals only once the history of acceleration averages, the history of velocity averages, and the history of displacement averages each have values within a time period that are substantially equal to one another within their respective tolerance.

9. The method of claim 4 wherein at least three averages are stored in each of the history of acceleration averages, the history of the velocity averages, and the history of the displacement averages.

10. The method of claim 4 further comprising the step of recording the signals if a predetermined time-out period has elapsed, even if the averages within the time period are not substantially equal to one another within its tolerance.

11. The method of claim 10 wherein a different predetermined time-out period is provided for recording each of the digitised acceleration signals, digitised velocity signals and digitised displacement signals.

12. A vibration data collection apparatus comprising:
    at least one input to receive electrical vibration signals from one or more vibration sensors;

an analogue-to-digital converter to convert the electrical vibration signals into digital vibration signals;

a first averager in communication with the analogue-to-digital converter to the determine an average of the digitised vibration signals over a predetermined period;

a storage device in communication with the first averager to store the average determined; and a processor adapted to:
  when data recording is not requested:
    store the average determined by the first averager in the storage device so as to provide a history of averages, and
  when data recording is requested:
    check the history of averages to determine if the averages within a time period are substantially equal to one another within a first tolerance; and
    record the digitised vibration signals if the averages within the time period are substantially equal to one another within the first tolerance.

13. The apparatus of claim 12 wherein the vibration sensor is an accelerometer, the digitised vibration signals are acceleration vibration signals and the history of averages is a history of acceleration averages.

14. The apparatus of claim 13 further comprising:
a first integrator to convert the acceleration vibration signals into velocity vibration signals; and
a second averager in communication with the first integrator to determine an average of the velocity vibration signals over a predetermined period;
wherein the processor is further adapted to:
  when velocity data recording is not requested:
    store the average determined by the second averager in the storage device so as to provide a history of velocity averages, and
  when velocity data recording is requested:
    check the history of velocity averages to determine if the velocity averages within a time period are substantially equal to one another within a second tolerance; and
    record the velocity vibration signals if the velocity averages within the time period are substantially equal to one another within the second tolerance.

15. The apparatus of claim 14 further comprising:
a second integrator to convert the velocity vibration signals into displacement vibration signals; and
a third averager in communication with the second integrator to determine an average of the displacement vibration signals over a predetermined period;
wherein the processor is further adapted to:
  when displacement data recording is not requested:
    store the average determined by the third averager in the storage device so as to provide a history of displacement averages, and
  when displacement data recording is requested:
    check the history of displacement averages to determine if the displacement averages within a time period are substantially equal to one another within a third tolerance; and
    record the displacement vibration signals if the displacement averages within the time period are substantially equal to one another within the third tolerance.

16. The apparatus of claim 15 wherein the first, second and third averagers are exponential averagers.

17. The apparatus of claim 14 wherein the storage device comprises a buffer with a minimum length of three.

18. The apparatus of claim 14 wherein the processor is adapted to record the signal whose history is first to have values that substantially equal one another within its tolerance.

19. The apparatus of claim 18 wherein the processor is further adapted to record the signal whose history is next to have values that substantially equal one another within its tolerance.

20. The apparatus of claim 14 wherein the processor is adapted to record the velocity vibration signals only once the history of acceleration averages and the history of velocity averages each have values that substantially equal one another within their respective tolerances.

21. The apparatus of claim 20 wherein the processor is further adapted to record the displacement vibration signals only once the history of acceleration averages, the history of velocity averages and the history of displacement averages each have values that substantially equal one another within their respective tolerances.

22. The apparatus of claim 14 wherein the processor is further adapted to record the vibration signals if a predetermined time-out period has elapsed, even if the history of averages do not have values within a time period that are substantially equal to one another within its tolerance.

23. The apparatus of claim 22 wherein a different predetermined time-out period is provided for the recording of each of the acceleration vibration signals, velocity vibration signals and displacement vibration signals.

* * * * *